US005183911A

United States Patent [19]

[11] Patent Number: 5,183,911

[45] Date of Patent: Feb. 2, 1993

Washüttl et al.

[54] PROCESS FOR THE PRODUCTION OF STABLE OZONIZED OILS FROM UNSATURATED VEGETABLE OILS

[75] Inventors: Josef Washüttl, Wien, Austria; Renate Viebahn, Iffezheim, Fed. Rep. of Germany

[73] Assignee: Dr. J. Hansler GmbH, Iffezheim, Fed. Rep. of Germany

[21] Appl. No.: 866,251

[22] Filed: Apr. 6, 1992

Related U.S. Application Data

[63] Continuation of Ser. No. 626,244, Dec. 12, 1990, abandoned, which is a continuation of Ser. No. 20,711, Mar. 2, 1987, abandoned.

[30] Foreign Application Priority Data

Mar. 1, 1986 [DE] Fed. Rep. of Germany ....... 3606735

[51] Int. Cl.[5] ........................ C07B 51/43; C11B 3/00; C11B 13/00

[52] U.S. Cl. .................................... 554/181; 554/182; 554/183

[58] Field of Search ........................ 554/181, 182, 183

[56] References Cited

U.S. PATENT DOCUMENTS 2,862,940 12/1958 Otsuki et al. ........................ 260/406

OTHER PUBLICATIONS

Bailey, P. S., Chemical Reviews, Aug.-Dec., 1958 pp. 988-995.

*Primary Examiner*—Jose G. Dees
*Assistant Examiner*—Joseph Conrad, III
*Attorney, Agent, or Firm*—Penrose Lucas Albright

[57] ABSTRACT

Production of stable ozonized oils from unsaturated vegetable oils by introducing an ozone-oxygen mixture into the oil until it reaches saturation, and following the ozonization, an extraction process in acid medium is carried out in the presence of a redox reaction system, which is capable of moderately reacting the radicals in the presence of a synthetic or natural anti-oxidation medium or reducing medium.

12 Claims, No Drawings

PROCESS FOR THE PRODUCTION OF STABLE OZONIZED OILS FROM UNSATURATED VEGETABLE OILS

RELATED APPLICATIONS

This is a continuation of application Ser. No. 07/626,244 filed Dec. 12, 1990 now abandoned, which is a continuation of application Ser. No. 07/020,711 filed Mar. 2, 1987 now abandoned.

FIELD OF THE INVENTION

The invention relates to a process for the production of stable ozonized oils from unsaturated vegetable oils with removal of physiologically questionable low molecular aldehydes and ketones. The process according to the invention supplies valuable products which are useful for therapeutic and cosmetic purposes by humans and animals.

BACKGROUND OF THE INVENTION

Bactericidal effect of ozonized olive oil have long been known (cf. for instance, G. Cronheim, Journal of the American Pharmaceutical Association, Vol. 36 (1947), P. 274). However, such commercial products were soon taken off the market because of their great tendency toward dissociation, (cf. M. Schonbauer, OzoNachrichten, Vol. 3 (1984), p. 28).

As a result of the reaction of ozone with unsaturated fatty acids, peroxide products occur as therpeutically valuable material, but low molecular aldehydes and ketones, especially malonic dialdehyde, also occur as undesirable by-products.

The peroxide products are used, for example, in skin fungicidal infections, ulcus cruris, of wounds which heal poorly, infected wounds and the like because of their bactericidal consequences relative to bacteria, fungi and yeast infections. On the other hand, ketones and aldehydes which are formed as by-products do not provide a therapeutic effect and for the most part are physiologically hazardous. This is especially true of malonic dialdehyde, which occurs in not inconsiderable quantities from the complete ozonization of unsaturated vegetable oils (cf. Registry of Toxic Effects of Chemical Substances, U.S. Department of Health and Human Services, 1984).

SUMMARY OF THE INVENTION

The instant invention involves ozonized products of unsaturated vegetable oils which are therapeutically useful products, which remain stable for long periods of time and which have a minimal content of low molecular aldehydes and ketones, especially malonic dialdehyde.

In the course of research, it was determined that malonic dialdehydes were easily extracted at a rate of far above 50% with water, from products which were easily obtained by introduction of an ozone-oxygen mixture until saturation point is reached. However, this process was not practicable, since the therapeutically useful peroxides were also up to 90% destroyed. A special extraction process was developed according to the invention, which allows for thorough removal of malonic dialdehyde, without causing a substantial decrease of a peroxide coefficient which represents a measure of the content of peroxide products and therewith the value of the product.

The object of invention is therefore a process for the production of stable ozonized oils from unsaturated vegetable oils by introduction of an ozone-oxygen mixture into the oil involved until it reaches saturation, after the ozonization an extraction process is carried out in acid medium in the presence of a redox reaction system, preferably a biological redox reaction system, which is capable of moderate reaction with radicals and is carried out in the presence of synthetic or natural antioxidation medium or reducing medium. Olive oil, thistle oil, wheat germ oil, linseed oil, almond oil, walnut oil, sunflower seed oil, poppyseed oil, sesame seed oil, castor oil, croton oil, soybean oil and palm oil can be the unsaturated vegetable oils used in the process. However, olive oil and thistle oil are preferred. Olive oil is especially preferred.

DESCRIPTION OF THE PREFERRED EMBODIMENTS

The redox reaction system which is used, and which is capable of radicalic reaction, works both as electron acceptor and as electron donor Some preferred examples for redox reaction systems are ascorbic acids, the essentially membrane-associated redox system vitamin E, vitamin A and the biological quinoids/benzoids systems Ascorbic acid is particularly preferred.

The extraction process is preferably carried out at a pH of 3.5 to 6.5. Ascorbic acids or citric acids can be used as acidfiers to provide a pH level within the desired range.

Butylhydroxylansinol, gallate and hydrogen sulfite are preferably used as an anti-oxidation medium or a reducing medium.

The invention is explained hereinafter with reference to olive oil. Similar processes can also be used for thistle oil and other unsaturated vegetable oils.

Pure DAB 8 olive oil is used. Production of the ozone-oxygen mixture is obtained by following the specifications for production or bottling of medical oxygen. The ozone is formed by silent electric discharge (absolutely nitrogen-free, to avoid the formation of aggressive and reactant nitrogen oxides, especially radicals). For ozonization of the oil, from one to two liters per minute are treated with a continuous run-through of gas. The ozone concentration which is used is preferably in the range of fifty to seventy micrograms per milliliter. The bubbling through of the oil occurs with the use of a cylindrical vessel with as high as possible a "water column" under thermostat setting at about 20 degrees C. A continuous flow through is important, especially just before the saturation limit is reached, which is observable by coagulation of the product at 20 degrees C. For twelve liters in a sixty centimeter high cylindrical vessel having a diameter of about twenty centimeters, a uniform bubbling time of 180 to 300 hours is required depending on the specific ozone concentration of the ozone-oxygen discharge mixture.

For the extraction process, approximately two to twenty, or more preferably three to ten a or most preferably approximately five a milliliters of aqueous extraction solution are used per gram of ozonized oil. The extraction preferably occurs as a result of a 10- to 60-minute shaking process for aqueous solution/saturated oil mixing. The shaking process can be repeated to increase the effectiveness. Excess sulfite which is still present in the extract can be removed by shaking out the oily phase with two percent aqueous ascorbic acid solution.

The peroxide coefficient, determined by Sully (DGF unit methods for the testing of fats, fatty products and reduced materials, Deutsche Gesellschaft fur Fetwissenschaft, Munster/Westfalen, 1950, P. 76) and the content of malonic aldehyde (determined according to H. Scherx et al., Mikrochem. Acta, issue 5, 1967), are important for evaluating the quality of the product.

The particularly preferred combinations for the extraction process according to the invention are ascorbic acid plus butylhydroxylanisol, citric acid and butylhydroxylanisol and also ascorbic acid and hydrogen sulfite.

The invention is explained in more detail hereafter relative to the examples.

DETERMINATION OF MALONIC DIALDEHYDE CONTENT

The determination is obtained by the reaction of malonic dialdehyde with 2-methylindole in an alcohol-acid-base solution, into a durable, intensively colored aggregate.

Reactants and Standard Solutions 0.1 grams of 1-methylene indole dissolved in 100 milliliters of pure ethanol EtOH; 25 milliliters of concentrated Hcl being added thereto shortly before use.

Standard reaction: 45.86 milligrams of malonic dialdehyde tetraethylacetal are mixed with 3 milliliters of concentrated Hcl and are heated for three minutes to 50 degrees C. Then it is filled to 500 milliliters with distilled water. 100, 200, 300, 400, and 500 microliters of this solution are filled up to one milliliter and are mixed with two milliliters of 2-methylindole solution. A blank value is determined simultaneously, and one milliliter of distilled water is mixed with two milliliters of reactant solution. An absorbance at 55 nm is measured after twenty minutes.

Determination of malonic dialdehyde in the ozonized oil: Approximately one gram of the solid oil is weighed precisely and heated slightly to fluidity under nitrogen atmosphere (about 30 degrees C). Since the oil is immiscible with the reactants, except for two milliliters of methylindole, another one milliliter of distilled water is added and is stirred for twenty minutes reaction time in a nitrogen atmosphere with a magnetic stirrer, to facilitate a complete reaction of the malonic dialdehyde. Then the alcohol phase is measured (following deposition of the fat) in comparison with the parallel standard reaction used each time.

DETERMINATION OF THE PEROXIDE COEFFICIENT

Ten milliliters of glacial acetic acid and ten milliliters of chloroform for deaeration of the mixture are heated in a dry, defatted retort with attached cooler, with reflux, and then one kilogram of KJ is added in 1.3 milliliters of water (freshly treated), without interrupting the boiling, and after another two minutes approximately one gram of oil (weighed precisely) is added. After four minutes, fifty milliliters of distilled water are added and the mix is cooled to room temperature.

After addition of one milliliter of 1-percent starch solution and changing the mix with 0.1 n of sodium sulfate solution it is titrated until the aqueous layer is colorless.

Formula:

-continued $$\text{Peroxide coefficient } POZ = \frac{a \cdot 0.1 \cdot 1000}{E}$$

$a$ . . . milliliter of thiosulfate solution used
$E$ . . . weight of sample in grams

EXAMPLE 1

Twelve liters of (DAB 8) olive oil are fed into a cylindrical vessel of about twenty centimeters diameter. The fill level is about sixty centimeters. The vessel is thermostatically set to provide 20 degrees C. An ozone-oxygen mixture is bubbled through the vessel uniformly for 240 hours at a flowthrough velocity of one to two liters/minute. This ozone-oxygen mixture has been produced by silent electric discharge in a pure, nitrogen-free oxygen atmosphere. The resulting ozone concentration is about sixty micrograms gram per milliliter.

The product which is obtained is determined to have a peroxide coefficient (POZ) of 929 and a malonic dialdehyde content of 445 micrograms per gram of oil.

One hundred grams of the ozonized oil are stirred slowly in a nitrogen atmosphere at 30 degrees C until it reaches fluidity and then it is removed and mixed with five hundred milliliters of a two-percent ascorbic acid solution in the presence of five milliliters, thirty eight-percent $NaHSO_3$, solution. After fifteen minutes of shaking, the phases are separated and the oily phase is shaken out, regenerated with three hundred milliliters of a two-percent ascorbic acid, completely to remove the excess sulfite. With another peroxide coefficient determination of the product a value of 876 is obtained. In the aqueous extract there is a POZ of 0. The oily product contains malonic dialdehyde in a quantity of sixty-eight micrograms per grams of oil and the aqueous extract contains 424 micrograms per gram of extraction medium.

This means that in the extraction of the malonic dialdehyde up to 85% has been removed, while the peroxide coefficient is decreased by only 5.7 percent. The aqueous extract contains no peroxide, as desired, while the malonic dialdehyde has passed almost completely into the aqueous phase.

EXAMPLE 2

Olive oil samples as produced in Example 1 were subjected to different extraction processes. For each, one gram of ozonized oil is shaken out for fifteen minutes with different aqueous solutions. Then the POZ and malonic dialdehyde content are determined. The results are summarized in the following table.

TABLE

| Aqueous extractions | POZ | | Malonic Dialdehyde (microg/g) | |
|---|---|---|---|---|
| solution | Oil | Extract | Oil | Extract |
| without extraction | 929 | x)1 | 445 | x)1 |
| +10 ml dist. water | 113 | 16 | 176 | 280 |
| +3 ml dist water/EtOH 1:1 | 103 | 16 | x)1 | x)1 |
| +3 ml ascorbic acid solution (1 g/100 ml water) | 413 | 0 | 91 | 310 |
| +10 ml ascorbic acid solution (1 g/100 ml water) | 425 | 0 | 146 | 633 |
| +10 ml ascorbic acid solution 1 g/100 ml) + BHA | 864 | 0 | 210 | 530 |
| +10 ml ascorbic acid | 740 | 0 | 145 | 625 |

TABLE-continued

| Aqueous extractions solution | POZ Oil | POZ Extract | Malonic Dialdehyde (microg/g) Oil | Malonic Dialdehyde (microg/g) Extract |
|---|---|---|---|---|
| solution (1 g/100 ml) + gallate | | | | |
| +10 ml citric acid solution (1 g/100 ml) + BHAx | 799 | 18 | 215 | 640 |
| +10 ml citric acid solution (1 g/100 ml) + gallate | 704 | 16 | 190 | 700 |
| +10 ml dist. water +100 microl. $NaHSO_3$ 38%, | 63 | 0 | x)1 | x)1 |
| +10 ml dist. water +50 microl. $NaHSO_3$ 38%, | 87 | 0 | x)1 | x)1 |
| +10 ml ascorbic acid solution (2 g/100 ml) + 100 microl. $NaHSO_3$ 38%, x)2 | 649 | 0 | 47 | 306 |
| +10 ml ascorbic acid solution (2 g/100 ml) + 50 microl. $NaHSO_3$ 38%, x)2 | 876 | 0 | 68 | 424 |

All results summarized here are averages from two tests.

"x)1" means that the relevant parameter was not determined,

"x)2" means that excess sulfite was removed completely with a single shaking out of the oil with ten milliliters water (2 grams of ascorbic acid per 100 milliliters), and the POZ and malonic dialdehyde content of the ozonized oil did not change greatly; the peroxide coefficient dropped from 876 to 860, the malonic dialdehyde content from sixty-eight micrograms per grams to fifty-two micrograms per gram.

"x" represents butylhydroxylanisol.

Particularly favorable results are thus obtained by the combination of ascorbic acid and butylhydroxylanisol, citric acid and butylhydroxylanisol and also ascorbic acid and hydrogen sulfite.

An example for ozonized thistle oil:

| | POZ Oil | POZ Extract | Malonic dialdehyde (microg/g) Oil | Malonic dialdehyde (microg/g) Extract |
|---|---|---|---|---|
| without extraction | 2315 | — | 704 | |
| aqueous extraction +10 ml ascorbic acid solution (2 g/100 ml) +50 microl. 38% $NaHSO_3$ | 2118 | — | 62 | 621. |

The foregoing description has been given for clearness of understanding by those skilled in the art and unnecessary limitations should not be implied therefrom. Citations of literature in the specification are incorporated herein by reference.

Having disclosed out invention what we claim as new and to be covered by Letters Patent of the United States is:

1. A process for producing stable ozonized oils from unsaturated vegetable oils comprising the steps of:

placing an unsaturated vegetable oil in a vessel having means for bubbling a gaseous mixture therethrough:

bubbling said gaseous mixture through said unsaturated vegetable oil to produce a saturated, ozonized oil, said unsaturated vegetable oil being maintained at a constant temperature and said gaseous mixture comprising ozone and oxygen:

acidifying said ozonized oil;

adding an aqueous solution of antioxidation or reducing agent;

extracting undesirable by-products from said ozonized oil, said undesirable by-products being produced in said bubbling step, by shaking the mixture of said ozonized oil and said aqueous solution in the presence of a redox reaction system, said redox system selected from the group comprising ascorbic acid, vitamin E, vitamin A and a quinoid/benzoid system, said redox system being capable of radicalic reaction; and removing said aqueous solution, containing said undesirable by-products so that a stable ozonized oil containing beneficial peroxide products remains.

2. A process according to claim 1, wherein said unsaturated vegetable oil is an oil selected from a group consisting of olive oil, thistle oil, wheat germ oil, linseed oil, almond oil, walnut oil, sunflower seed oil, poppyseed oil, sesame seed oil, castor oil, croton oil, soybean oil or palm oil.

3. A process according to claims 1 or 2 wherein said redox system employs a substance selected from a group consisting of ascorbic acid, vitamin A, or vitamin E.

4. A process according to claims 1 or 2 wherein said redox reaction system comprises quinoid/benzoid systems.

5. A process according to claims 1 or 2, wherein said acidifying step produces a pH of from 3.5 to 6.5.

6. A process according to claim 5, wherein ascorbic acid is used in said acidifying step.

7. A process according to claim 5 wherein citric acid is introduced into said ozonized oil during said acidifying step.

8. A process according to claim 5, wherein said antioxidation agent comprises butylhydroxylanisol.

9. A process according to claim 5, wherein said antioxidation agent comprises gallate.

10. A process according to claim 5, wherein said anti-oxidation agent comprises a biological anti-oxidant.

11. A process according to claim 5, wherein said reducing agent comprises hydrogen sulfite.

12. A process as claimed in claim 1 wherein said constant temperature is about 20 degrees Centigrade.

* * * * *